United States Patent [19]

Schneider

[11] Patent Number: 5,520,208

[45] Date of Patent: May 28, 1996

[54] RESILIENT SEAL FOR A LIQUID-GAS ACCUMULATOR

[75] Inventor: Jeffry A. Schneider, Katy, Tex.

[73] Assignee: Accumulators, Inc., Houston, Tex.

[21] Appl. No.: 415,265

[22] Filed: Apr. 3, 1995

[51] Int. Cl.$^6$ ............................................. F16L 55/055
[52] U.S. Cl. ............................ 137/207; 137/192; 138/26; 251/332
[58] Field of Search ................................. 137/192, 207; 138/26; 251/332

[56] References Cited

U.S. PATENT DOCUMENTS

| 3,319,658 | 5/1967 | Mercier . |
| 3,548,868 | 12/1970 | Mullaney . |
| 4,176,681 | 12/1979 | Mackal . |
| 4,278,105 | 7/1981 | Koomey . |
| 4,294,288 | 10/1981 | Murthy . |
| 4,403,629 | 9/1983 | deVries . |
| 4,518,005 | 5/1985 | Allewitz . |
| 5,097,862 | 3/1992 | Schneider . |

Primary Examiner—Gerald A. Michalsky
Attorney, Agent, or Firm—Fulbright & Jaworski

[57] ABSTRACT

A resilient seal for a liquid-gas accumulator of the type having a housing with a top gas port and a bottom liquid port. A valve assembly including a spring-loaded normally open poppet valve surrounded by a sleeve is positioned in the liquid port, and a device for controlling the opening and closing of the valve in response to the level of liquid in the housing is also provided within the housing. The resilient seal is positioned on top of the popper valve and comprises a first resilient seal member and a second resilient seal member. The first resilient seal member is positioned to seat on the first end of the sleeve outside of the valve seat as the valve closes thereby providing a secondary seal. The second resilient seal member is positioned atop the first resilient seal member and is positioned to seat on a first end of an anti-extrusion ring surrounding the sleeve as the valve closes, thereby providing a tertiary seal and creating a suction effect causing the first resilient seal member to better adhere to the first end of the sleeve.

17 Claims, 3 Drawing Sheets

RESILIENT SEAL FOR A LIQUID-GAS ACCUMULATOR

BACKGROUND OF THE INVENTION

It is well known to provide a liquid-gas accumulator to provide a supply of hydraulic fluid at a high flow rate when the accumulator is actuated. Various types of accumulators have been used in the past such as bladder types, guided float types and non-guided float types, some of which actuate a spring-loaded liquid inlet-outlet valve. In particular, U.S. Pat. No. 5,097,862 discloses a non-guided float type liquid-gas accumulator having a housing with a top gas port and a bottom liquid port. A spring-loaded, normally open valve is positioned in the liquid port and a buoyant float is rigidly connected to the valve element for controlling the opening and closing of the valve in response to the liquid level in the housing. The accumulator of the '862 patent is provided with a resilient seal located between the float and the valve element. The seal is positioned to seat around the valve as the valve closes, thereby providing a secondary seal.

While the resilient seal of the '862 patent provides a secondary seal, some leakage may still occur due to unseating of the seal while the valve is in the closed position. Therefore, there is a need for a resilient seal that will better adhere to the mating surface when the valve is in the closed position, thereby preventing leakage.

SUMMARY OF THE INVENTION

The present invention is directed to a resilient seal for a liquid-gas accumulator that provides a better seal about the bottom liquid port when the liquid valve is in the closed position. The resilient seal may be used in any type of accumulator, such as bladder types, guided float types and non-guided float types, having a spring-loaded liquid inlet-outlet valve. Accumulators of these types generally comprise a housing having a top gas port and a bottom liquid port. A gas charging valve is positioned in the top port for admission of high pressure gas, and a valve assembly is positioned in the liquid port. The valve assembly includes a sleeve having a first end which includes a valve seat, a valve element guided in the sleeve and coacting with the seat for opening and closing the port, and spring means yieldably urging the valve to an open position. The valve element is preferably a poppet. The accumulator also may include means for controlling the opening and closing of the valve in response to the level of liquid in the housing. The control means may include any device for regulating a liquid level, such as a bladder, a guided float or a non-guided float.

The resilient seal of the present invention is located on top of the valve element. The resilient seal comprises a first resilient seal member positioned to seat on the first end of the sleeve outside of the valve seat as the valve closes thereby providing a secondary seal. The resilient seal further includes a second resilient seal member positioned atop the first resilient seal member. The second resilient seal member is also positioned to seat on the first end of the sleeve outside of the valve seat as the valve closes thereby providing a tertiary seal and creating a suction effect causing the first resilient seal member to better adhere to the first end of the sleeve. According to a preferred embodiment, the valve element is a poppet and the means for controlling the opening and closing of the value is a buoyant float. The buoyant float may be rigidly connected to the top of the poppet with the resilient seal located therebetween.

The first resilient seal member and the second resilient seal member extend outwardly beyond the periphery of the poppet valve. The second resilient seal member extends outwardly beyond the periphery of the first resilient seal member, and is positioned to seat on a first end of an anti-extrusion ring surrounding the sleeve as the valve closes. The first end of the anti-extrusion ring is substantially co-planar with the first end of the sleeve. The second resilient seal member is positioned to seat on the first end of the anti-extrusion ring near a midpoint between the outer periphery and the inner periphery of the anti-extrusion ring. A connecting rod may be provided to connect the poppet valve, resilient seal and buoyant float. The connecting rod passes through an opening in the resilient seal and has a first end connected to the top of the poppet valve and a second end connected to the buoyant float.

The resilient seal may be directly molded or bonded to the top of the poppet. Where a connecting rod is used to connect a buoyant float to the poppet, the resilient seal may also be directly molded or bonded to the connecting rod. The second resilient seal member may be molded to the first resilient seal member, or the first and second resilient seal members may be a single unit of molded rubber. The first and second resilient seal members are each molded in downwardly shaped arcs. The downwardly shaped arc of the first resilient seal member exhibits a radius different from a radius of the downwardly shaped arc of the second resilient seal member.

It is an object of the present invention to provide a resilient seal for an accumulator wherein suction, caused by the differing radii of the first and second resilient seal members, is created about the resilient seal thereby causing the secondary seal, or first resilient seal member, to better adhere to the mating surface.

It is a further object of the invention to provide a second resilient seal member that creates a vacuum causing the first resilient seal member to better adhere to the mating surface. The second resilient seal member also provides a third seal about the bottom liquid port enclosing the primary and secondary seals.

It is a further object of the invention to provide a resilient rubber seal that is molded to the top surface of the poppet valve to create a more rigid rubber seal. The consistent shape of the seal creates a more consistent seal of the bottom liquid port.

It is also an object of the invention to provide a resilient rubber seal that is molded to the connecting rod of a non-guided float type accumulator to eliminate leakage between the connecting rod and the popper valve.

A further object of the invention is to provide a resilient rubber seal wherein the first and second resilient seal members have downwardly molded arcs to better engage the mating seal surface by forcing the seals toward the mating seal surface.

These and other features, aspects, advantages and objects of the present invention will become better understood with regard to the following description, appended claims and accompanying drawings.

DESCRIPTION OF THE PREFERRED EMBODIMENT

Figure 1:
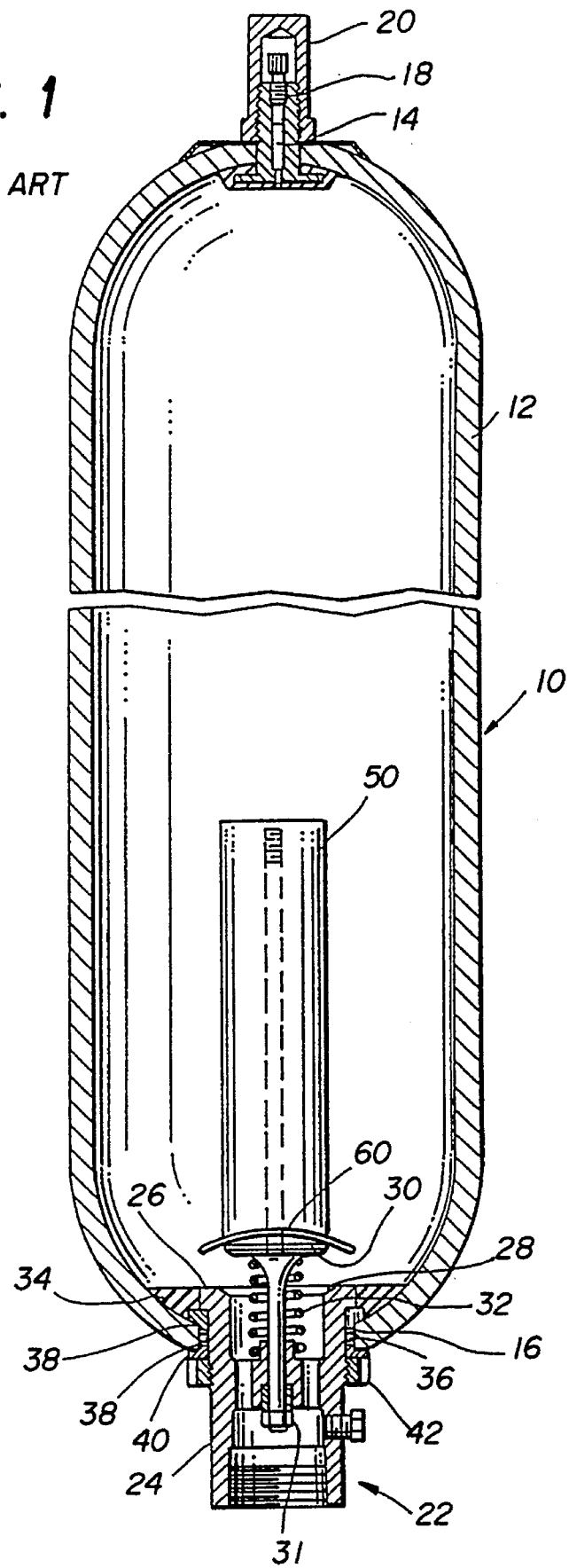
FIG. 1 is an elevational view, in cross section, of a prior art non-guided float type accumulator shown in an open position.

Referring now to the drawings and particularly to FIG. 1, the reference numeral 10 generally indicates a prior art liquid-gas accumulator of the non-guided float type, as disclosed in U.S. Pat. No. 5,097,862, having a housing 12 which may be of any suitable configuration, such as cylindrical or spherical, and is here shown as being cylindrical. The present invention is equally applicable to other types of accumulators, such as bladder types and guided float types, and the accumulator shown in FIG. 1 is shown for purposes of illustration only and forms no part of the present invention.

The housing 12 includes a top gas port 14 and a bottom liquid port 16. The top port 14 is adapted to receive a conventional high pressure gas charging valve 18 which may include a protective valve cap 20.

A valve assembly generally indicated by the reference numeral 22 is provided positioned in the liquid port 16. The valve 22 includes a sleeve 24 having a first end 26 which includes a valve seat 28. A valve element such as a popper valve 30 attached to a nut 31 coacts with the seat 28 for opening and closing the port 16. Spring 32 yieldably urges the valve element 30 to a normally open position. Various other components are provided for securing and sealing the valve assembly 22 in the port 16 including an anti-extrusion ring 34, an O-ring 36, backup ring 38, a spacer 40, and a lock nut 42.

Generally, the accumulator 10 includes a supply of hydraulic fluid and a precharge gas, usually nitrogen, for providing high pressure hydraulic fluid at the outlet of the valve assembly 22 upon actuation of a down-stream valve (not shown). Various types of bladders, guided floats and non-guided floats can be used to actuate and close the valve assembly 22 to prevent the escape of the precharged gas from the housing 12 when the liquid level within the housing 12 becomes low.

Figure 3:
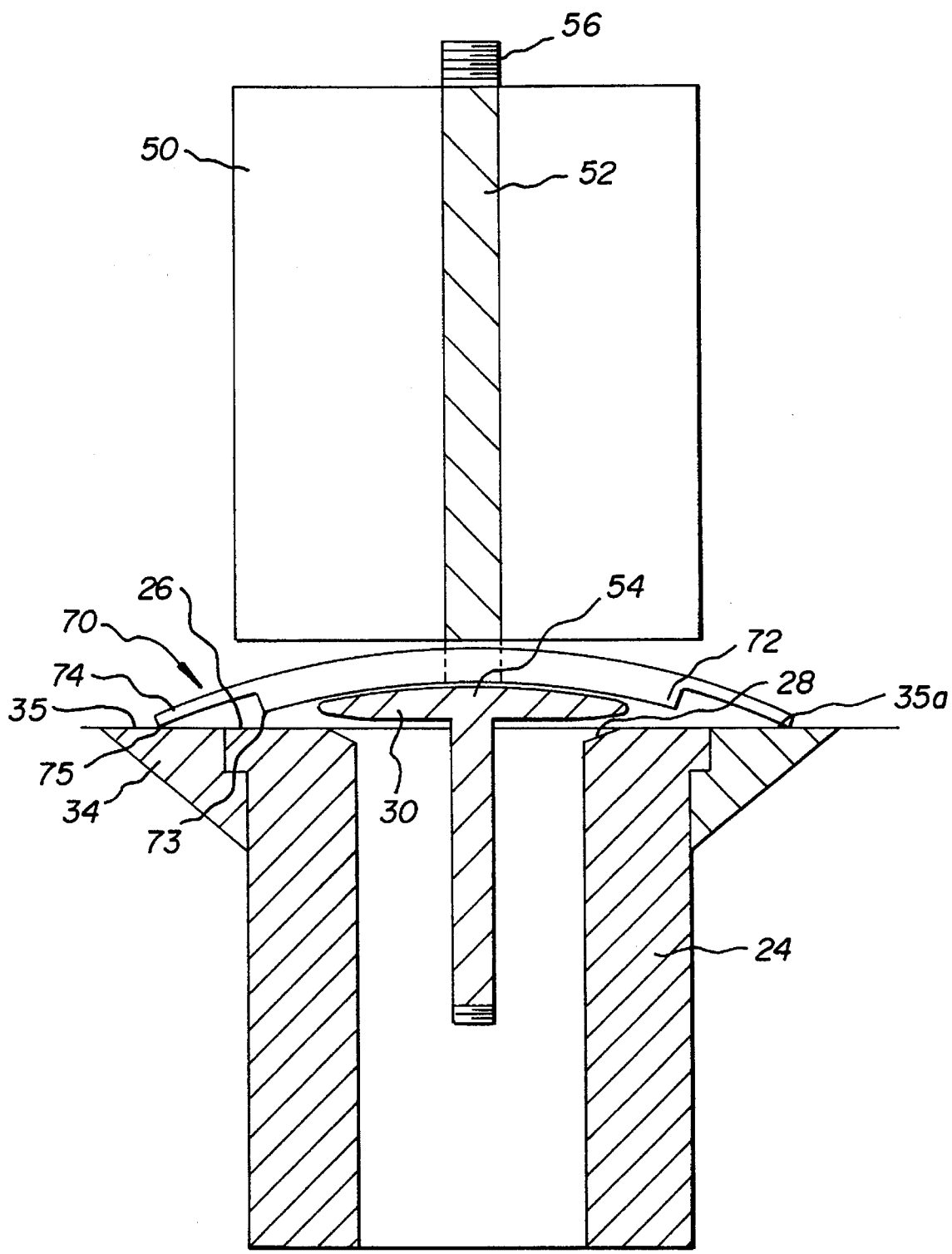
FIG. 3 is an elevational view, in cross section, of the resilient seal of FIG. 2 shown in a closed position.

Referring to FIG. 1 and FIG. 3, a buoyant float 50 may be provided which is rigidly connected to the poppet valve 30 by any suitable means, such as a rod 52 having a first end 54 threadably connected to the top of the poppet 30 and a second end 56 extending into and threadably connected to the float 50. The float 50 is preferably a solid material such as syntactic foam buoyancy material and one sold under the trademark "Eccofloat" is satisfactory. The float 50 may be of any suitable shape, but is preferably a cylinder having a diameter no greater than the outside diameter of the port 16 so that the float 50 may be installed into and removed from the port 16 with the valve assembly 22.

The float 50 does not "float" in the liquid in the housing 12 in the sense that it travels with the liquid level of the liquid. However, the float 50 is buoyant and its buoyancy assists in opening the poppet valve 30 from the valve seat Thereafter, the float 50, because it is rigidly connected to the poppet 30 becomes submerged as the liquid rises in the housing 12. When the liquid is released through the valve assembly 22, the weight of the float 50, as it loses its buoyancy, overcomes the spring 32 at which time the poppet 30 will seat on the valve seat 28 and prevent the escape of the gas pressure by the weight of the float 50, as it loses its buoyancy. Therefore, the buoyancy of the float 50 since it is fixedly connected to the top of the poppet valve 30 does not need any stabilizing guides such as the sidewalls of the housing or guide rods, all of which create friction and possible cocking and sticking. A secondary seal 60 is positioned on top of the popper valve 30 and provides a dual seal which allows the gas precharge in the housing to be sealed in the housing 12 as the accumulator is emptied of liquid. The secondary seal 60 will seat and prevent the escape of pressurized gas in the housing 12 without requiring a layer of liquid as in other types of accumulators.

Figure 2:
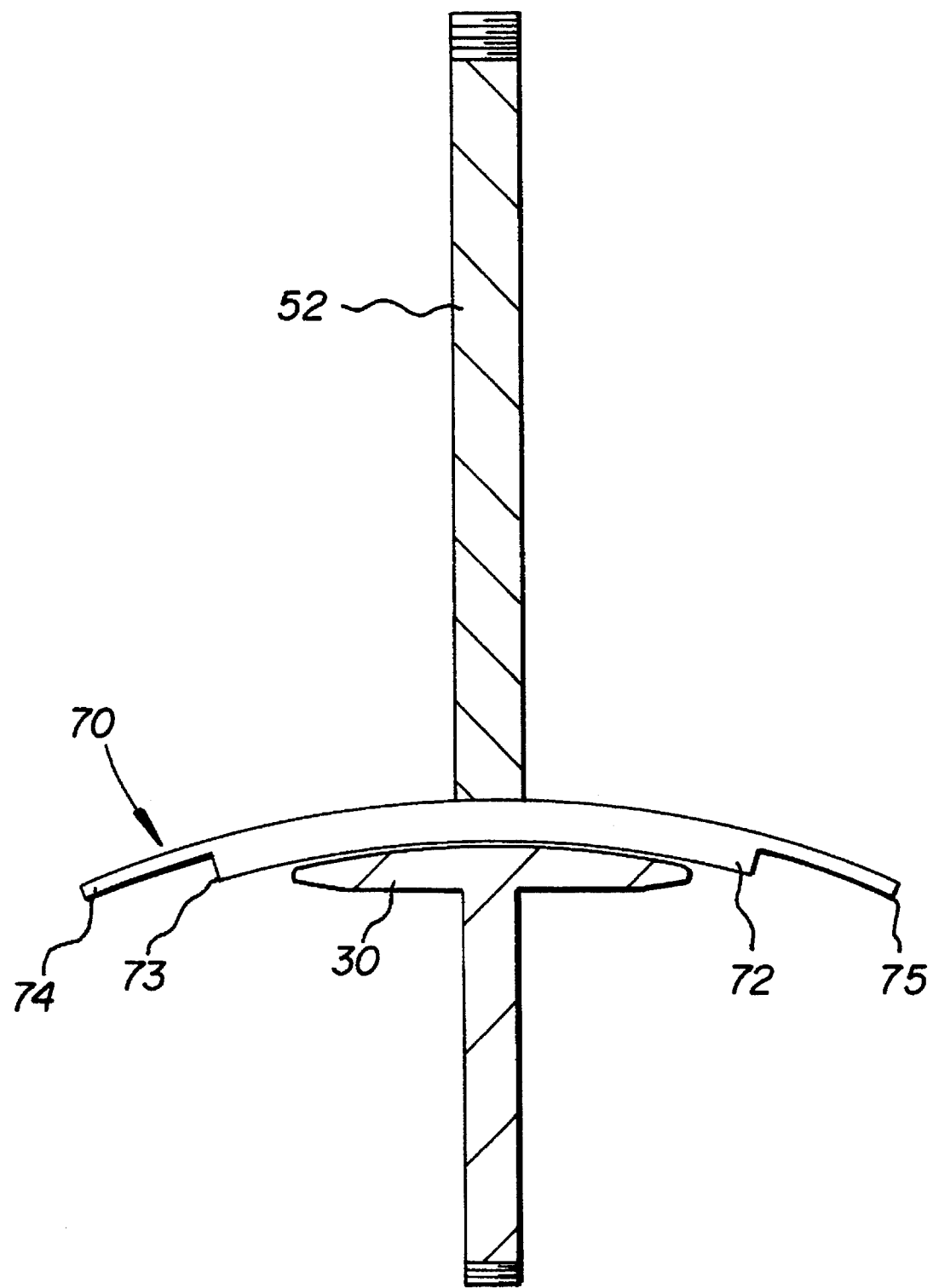
FIG. 2 is an elevational view, in cross section, of a preferred embodiment of the present invention showing a resilient seal for an accumulator of the type shown in FIG. 1.

Referring now to present invention as shown in FIGS. 2 and 3, a resilient secondary seal 70 is provided which is positioned on top of the poppet valve 30 and between the popper valve 30 and the buoyant float 50. The resilient seal may be made out of any suitable material such as rubber of buna-nitrile or "VITON" and extends outwardly beyond the periphery of the popper valve 30 so as to engage and seat on the end 26 of the sleeve 24 outside of the valve seat 28. The resilient secondary seal 70 includes a first resilient seal member 72 extending outwardly beyond the periphery of the poppet valve 30, and positioned to seat on the first end 26 of the sleeve 24 outside of the valve seat 28 as the valve closes thereby providing a secondary seal. The resilient seal 70 further includes a second resilient seal member 74 positioned atop the first resilient seal member 72. The second resilient seal member 74 extends outwardly beyond the periphery of the first resilient seal member 72, and is positioned to seat on a first end 35 of the anti-extrusion ring 34 as the valve closes, thereby providing a tertiary seal and creating a suction effect causing the first resilient seal member 72 to better adhere to the first end 26 of the sleeve 24. The first end 35 of the anti-extrusion ring 34 is substantially co-planar with the first end 26 of the sleeve 24. The second resilient seal member 74 is positioned to seat on the first end 35 of the anti-extrusion ring 34 near a midpoint 35a between the outer and inner peripheries thereof. The connecting rod 52 passes through an opening in the resilient seal 70 and has a first end connected to the top of the poppet valve 30 and a second end connected to the buoyant float 50.

The resilient seal 70 may be directly molded or bonded to the top of the poppet 30 and to the connecting rod 52. The second resilient seal member 74 may be molded to the first resilient seal member 72, or the first and second resilient seal members 72, 74 may be a single unit of molded rubber. The first and second resilient seal members 72, 74 are each molded in downwardly shaped arcs. The downwardly shaped arc of the first resilient seal member 72 exhibits a radius different from a radius of the downwardly shaped arc of the second resilient seal member 74.

In operation, normally, the weight of the float 50 will overcome the spring 32 and move the poppet valve element 30 onto the seat 28. However, with liquid in the housing 12, the buoyancy of the float 50 overcomes its weight and the poppet 30 will open the valve 22. After the poppet 30 is in the open position, the fixed float 50 will become submerged as the liquid increases in the housing 12. However, when the liquid is released, the weight of the float 50 will overcome the spring 32 causing the poppet to seat on the seat 28 and cause the first resilient seal member 72 to seat on the end 26 of the sleeve 24, and the second resilient seal member 74 to seat on the first end 35 of the anti-extrusion ring 34. When the second resilient seal member 74 seats on the end 35 of the anti-extrusion ring 34, a vacuum is created in the region between the lower outer edge 73 of the first resilient seal member 72 and the lower outer edge 75 of the second resilient seal member 74. The vacuum effect is caused by the differing radii of the first and second resilient seal members 72, 74 at their respective outer lower edges 73, 75. In addition, the downward arc of the resilient seal 70 causes the seal 70 to be pushed upwardly upon seating, thereby creating additional suction in the region between the outer lower edges 73, 75 of the first and second resilient seal members 72, 74. This suction causes the first resilient seal member 72 to better adhere to the end 26 of the sleeve 24, thereby providing a stronger seal. In addition, the second resilient seal member 74 provides a third additional seal enclosing the primary and secondary seals.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts, will readily suggest themselves to those skilled in the art and which are encompassed within the spirit of the invention and the scope of the appended claims.

I claim:

1. A resilient seal for a liquid-gas accumulator of the type comprising a housing having a top gas port and a bottom liquid port; a gas charging valve positioned in the top port for admission of high pressure gas; a valve assembly positioned in the liquid port, said valve assembly including a sleeve having a first end which includes a valve seat, a valve element guided in the sleeve and coacting with the seat for opening and closing the port, and spring means yieldably urging the valve to an open position; and means for controlling the opening and closing of the valve in response to the level of liquid in the housing; said resilient seal positioned on top of the valve element and comprising:

a first resilient seal member positioned to seat on the first end of the sleeve outside of the valve seat as the valve closes thereby providing a secondary seal; and a second resilient seal member positioned atop the first resilient seal member and positioned to seat on a surface adjacent to the first end of the sleeve outside of the valve seat as the valve closes thereby providing a tertiary seal and creating a suction effect causing the first resilient seal member to better adhere to the first end of the sleeve.

2. The resilient seal according to claim 1, wherein the valve element is a poppet valve.

3. The resilient seal according to claim 2, wherein the means for controlling the opening and closing of the valve comprises a buoyant float.

4. The resilient seal according to claim 3, wherein the buoyant float is rigidly connected only to the top of the poppet valve and the resilient seal is located between the float and the poppet valve.

5. The resilient seal according to claim 4, further comprising a connecting rod passing through an opening in the resilient seal and having a first end connected to the top of the poppet valve and a second end connected to the buoyant float.

6. The resilient seal according to claim 5, wherein the resilient seal is directly molded to the top of the poppet and to the connecting rod.

7. The resilient seal according to claim 5, wherein the resilient seal is directly bonded to the top of the popper and to the connecting rod.

8. The resilient seal according to claim 2, wherein the resilient seal is directly molded to the top of the poppet valve.

9. The resilient seal according to claim 2, wherein the resilient seal is directly bonded to the top of the poppet valve.

10. The resilient seal according to claim 2, wherein the first resilient seal member and the second resilient seal member extend outwardly beyond the periphery of the poppet valve.

11. The resilient seal according to claim 10, wherein the second resilient seal member extends outwardly beyond the periphery of the first resilient seal member.

12. The resilient seal according to claim 11, wherein the second resilient seal member is positioned to seat on a first end of an anti-extrusion ring surrounding the sleeve as the valve closes, said first end of the anti-extrusion ring being substantially co-planar with the first end of the sleeve.

13. The resilient seal according to claim 12, wherein the second resilient seal member is positioned to seat on the first end of the anti-extrusion ring near a midpoint between the outer periphery and the inner periphery of the anti-extrusion ring.

14. The resilient seal according to claim 1, wherein the second resilient seal member is molded to the first resilient seal member.

15. The resilient seal according to claim 1, wherein the first and second resilient seal members are a single unit of molded rubber.

16. The resilient seal according to claim 1, wherein the first and second resilient seal members are each molded in downwardly shaped arcs.

17. The resilient seal according to claim 16, wherein the downwardly shaped arc of the first resilient seal member exhibits a radius different from a radius of the downwardly shaped arc of the second resilient seal member.

* * * * *

UNITED STATES PATENT AND TRADEMARK OFFICE
CERTIFICATE OF CORRECTION

PATENT NO. : 5,520,208
DATED : May 28, 1996
INVENTOR(S) : Jeffry A. Schneider

It is certified that error appears in the above-indentified patent and that said Letters Patent is hereby corrected as shown below:

Abstract, line 7, change "popper" to -- poppet --.

Column 3, line 27, change "popper" to -- poppet --.

Column 3, line 51, change "Eccofloat" to -- Eccofloat --.

Column 4, line 15, change "popper" to -- poppet --.

Column 4, line 18, change "popper" to -- poppet --.

Claim 7, column 6, line 11, change "popper" to -- poppet --.

Signed and Sealed this

Tenth Day of September, 1996

Attest:

BRUCE LEHMAN

*Attesting Officer*  Commissioner of Patents and Trademarks